United States Patent [19]
Burns

[11] 3,825,911
[45] July 23, 1974

[54] REMOTE READING COMPASS SYSTEM
[75] Inventor: Harold S. Burns, Falmouth, Mass.
[73] Assignee: Electro Marine Corp.
[22] Filed: Dec. 7, 1972
[21] Appl. No.: 312,951

Related U.S. Application Data
[63] Continuation-in-part of Ser. No. 88,427, Nov. 10, 1970, abandoned.

[52] U.S. Cl............ 340/198, 340/324 R, 340/347 SY
[51] Int. Cl................................................. G08c 5/00
[58] Field of Search............ 340/198, 347 SY, 324 R

[56] References Cited
UNITED STATES PATENTS
3,537,086  10/1970  Andresen, Jr...................... 340/198

Primary Examiner—John W. Caldwell
Assistant Examiner—Robert J. Mooney
Attorney, Agent, or Firm—Herbert B. Barlow

[57] ABSTRACT

A magnetic compass system having an inductor element which is responsive to the magnetic field generated by a magnet system attached to a compass card, or directly from the earth's natural magnetic field, the inductor element having alternating current supplied thereto and having polyphase output connected to a servo loop having usual mechanical shafting, which is connected to a dial read-out. Within the servo loop a synchro differential may be placed to correct the indicated reading of the compass for magnetic variation and an encoder may be connected to the mechanical shaft of the servo loop to convert the rotary motion into logic signals such as binary coded signals, which then can be followed by a storage latching circuit and a decoder driver so that the output can be read on standard digital display units. Also by adding a 400 Hz or a 60 Hz synchro transmitter to the servo loop output shaft, the information available from the magnetic compass system, which is suitably corrected for variation, is available to the gyro distribution system and may therefore supply heading information to radar and other gyro repeater devices in the event of main gyro failure.

6 Claims, 4 Drawing Figures

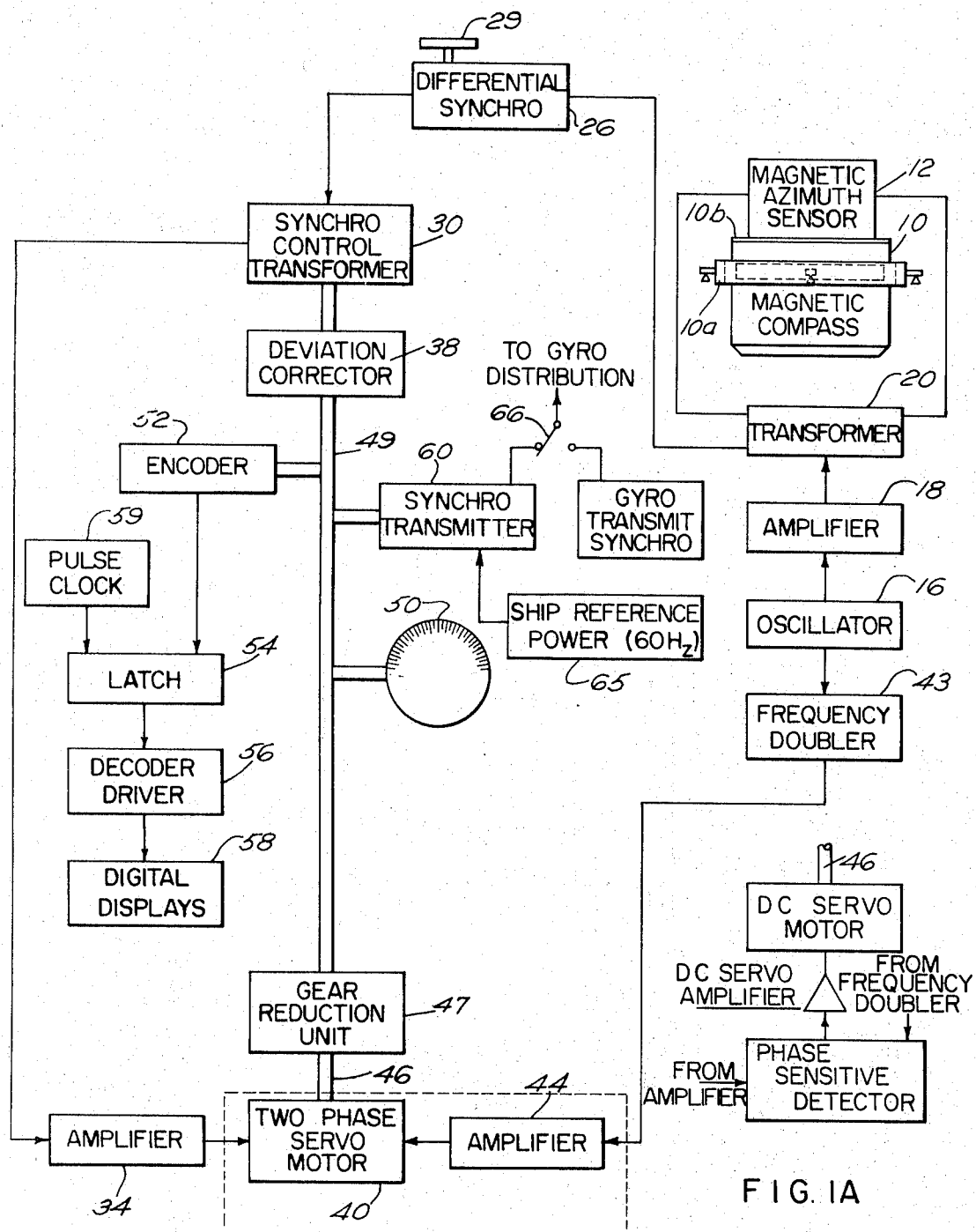
FIG. 1
FIG. 1A
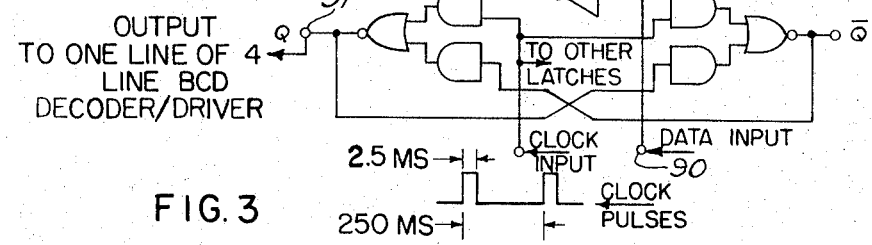
FIG. 3

REMOTE READING COMPASS SYSTEM

CROSS REFERENCE TO RELATED APPLICATION

This application is a continuation-in-part of my copending application Serial No. 88,427, filed Nov. 10, 1970, now abandoned.

BACKGROUND OF THE INVENTION

The simple magnetic compass has been used for centuries to provide a heading reference for the helmsman and navigator. Early ships made of wood posed no special problems of local attraction and deviation, and it was only necessary to apply "variations" to the compass heading to obtain a "true" heading. During the last century ships have been constructed using more and more steel and iron with considerable local attraction affecting the accuracy of the magnetic compass heading. The magnetic compass heading would be located where the helmsman could see it, and this was more often than not a poor location because of severe local attraction from objects inside the wheel-house or because the steel wheelhouse shielded the magnetic compass from the earth's natural magnetic field and also because the wheelhouse is frequently high above the roll-axis of the vessel which can cause the compass card to tilt and produce errors as a result of acceleration due to rolling.

Error due to local attraction has been subject to scientific analysis and a variety of correctors have been devised which usually will permit one skilled in the art to reduce the errors on all headings to zero or only a few degrees. After this has been done, a deviation card is prepared for future use which provides a deviation correction for each heading to convert a compass heading to a magnetic heading. Thus, there are usually two corrections to be applied by the navigator, deviation and variation, when using the magnetic compass.

Shortly after the turn of the century the gyroscopic compass was perfected and has since been preferred as a primary heading reference for use aboard warships, the merchant marine, and other deep water vessels. On such vessels the magnetic compass is used only as a backup in the event of gyro failure. The gyro compass is preferred because it is a true north-seeking compass, is unaffected by electrical appliances and magnetic materials and provides for remote indication and several repeaters.

The gyro compass is expensive, costing from 10 to 300 times the best magnetic compass, and if it is to be accurate, it has to be large and heavy and is usually installed in a special room substantially at the intersection of the roll and pitch axes. It is generally conceded that the most ideal manner to state a heading or direction is with reference to the true meridian involving no variables. As marine navigation technology has advanced, more and more shipboard equipment requires an input from an accurate heading reference. These include radar, sonar, dead reckoning tracers, plotters, radio direction finders and other radio aids to navigation to mention a few.

It can be readily concluded from the above that in the event of a gyro failure, most systems are worthless and a conventional magnetic compass is no longer a substitute for the gyro except for the helmsman. It is the purpose of this invention to provide a relatively simple and inexpensive backup for gyro-equipped vessels and a practical substitute for a gyro where a fraction-of-a-degree accuracy of the gyro and its expense and bulk cannot be justified.

As outlined above, the accomplishing of an accurate heading reference has expanded from one at the helmsman's position to many repeaters throughout a ship. Some users require a visual display. Other applications require analog or digital signals. It is conventional practice in gyroscopic compasses to provide a synchro transmitter with its rotor connected to the vertical axis to produce azimuth or heading information. The output of the gyro as a synchro transmitter is amplified and distributed throughout the ship to synchro receivers which turn a dial or card.

It has been well established that the helmsman requires a conventional card to watch and anticipate the turns or when assuming a new heading. Once on a given heading it is easier to steer using an illuminated digital display. Other users require heading information, have no requirement to observe a turning card and are better served by a large, easily read digital display. It is, therefore, one object of this invention to provide either form of repeater, the card and digital, or digital alone.

Another object of the invention is to provide a hold and display function at the digital readout so that successive readings are displayed at intervals permitting retention of what is seen. This has been found to greatly reduce fatigue of the observer.

Another object of the invention is to provide for a versatile input. On the one hand a magnetic sensor such as a compass-aided inductor or an earth-inductor may be used and, if so, means must be provided for correction for any residual deviation at the magnetic heading sensor and for variation so that the system yields a true heading without variables. On the other hand the input may be a synchro transmitter coupled to a gyro system and producing a true heading not requiring residual deviation or variation correction. To be most useful, such a system should enable the user to switch from one input to the other without adjustments of any kind.

Still another object of the invention is to provide a multiplicity of outputs, each tailored to the end use. The subject invention includes a servo loop which provides torque sufficient to drive various types of synchro elements without placing a reactive load on the input sensor. One output form might be a synchro differential to steer a radar in a true bearing mode. Another might by a synchro transmitter to drive a gyro repeater line as a substitute for a gyro which may have failed. Another output might be an analog to digital converter or encoder with a four-line BCD output to provide heading information for a computer supplied by an encoder.

SUMMARY OF THE INVENTION

The compass system of this invention overcomes many prior difficulties and basically consists of a pickup coil or inductor element responsive to magnetic field and electrically connected to a properly damped servo system. The servo system is a followup system which drives a data output shaft that turns a compass card to indicate heading. Also connected to the data output shaft is an encoder which changes the shaft angle data to precise digital logic and this encoder may operate one or more electronic digital numeric displays. The data output shaft may also have connected thereto a synchro transmitter energized at the frequency used by such auxiliary systems, as gyro systems and radar indicators, and may operate radars and other gyro repeaters, navigational equipment in a true bearing mode. In addition, between the pickup coil or inductor mounted on the compass and the control transformer, there may be inserted a differential synchro and by varying the position of the rotor, an angular offset may be placed into the system by a calibrated dial which may be the variation of the earth's magnetic field in which the vehicle is operating. A mechanical deviation corrector is inserted between the synchro control transformer of the data output shaft to remove any residual deviation remaining after conventional correction techniques have been applied. The mechanical corrector may be constructed of a flexible metal circular band that may be distorted by a number of equally spaced screws arranged around the cirumference of the band and by having a roller ride around on the band, the angular position of the control transformer will lead or lag according to whether the deviation is easterly or westerly. On certain types of ships there are a number of forces acting upon a compass card such as centrifugal acceleration forces caused by the compound action of pitch and roll. This causes the compass card which is the main sensing device to swing. It has been mentioned that this system has a numeric display device driven by an encoder, and if the vessel is swinging wildly it will be apparent that the digital display will change so fast that the human eye and brain will be incapable of processing the information. It is impossible to retain information if the interval between information flashes is less than 200 to 250 milliseconds. In other words, approximately four per second. The iconic memory is erased if new information is displayed within the 250 millisecond period. Therefore, in the instant system between the encoder and the decoder driver that will illuminate the numeric displays, a gate or latch is provided and a pulse clock which can take the form of an oscillator or pulse generator to provide short pulses of approximately 2.5 milliseconds length spaced at approximately 250 milliseonds which will open the gate and permit the encoder information to be passed on to the decoder driver and the display. The latch or gate will then close and the information will be displayed for 250 milliseconds. The gate will open again and new information from the encoder may be passed on to the numeric display and so forth.

BRIEF DESCRIPTION OF THE DRAWINGS

FIG. 1 is a block diagram illustrating the manner in which the compass system of this invention may be connected;

FIG. 1A is a schematic of a dc servo system replacement;

FIG. 3 is a schematic of the latch.

DESCRIPTION OF THE PREFERRED EMBODIMENT

Figure 2:
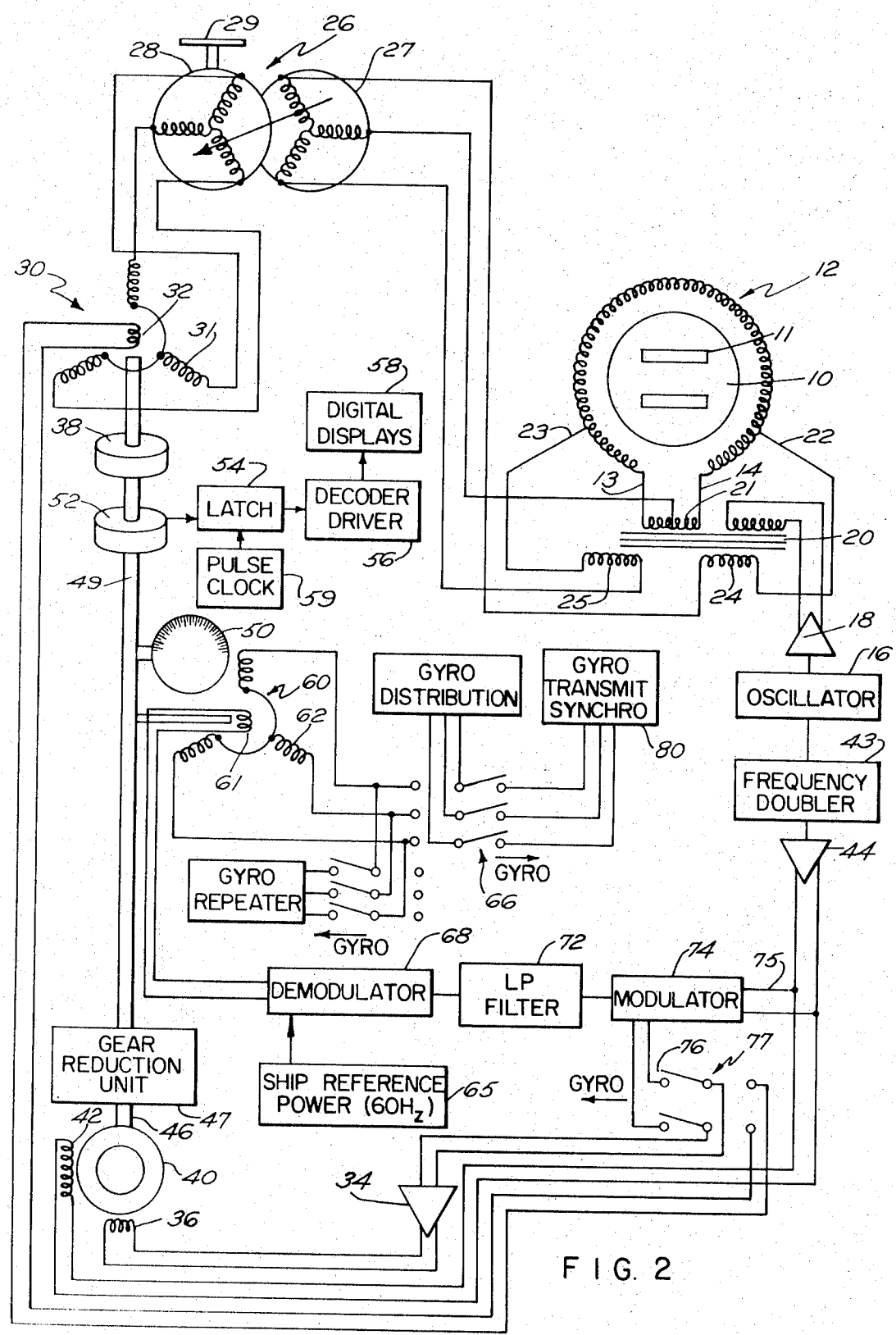
FIG. 2 is a schematic diagram in which certain blocks are used for conventional electronic apparatus illustrating the manner in which the servo loop and synchro elements in this loop are connected and interconnected to a gyro system.

Referring to the drawings there is illustrated in block form a magnetic compass bowl 10 in a suitable gimball mount 10a, which is the illustrated device for producing a magnetic field, and adjacent to this magnetic compass is an inductor element 12 which may be physically mounted on top of the compass verge ring 10b and which will sense the direction of the magnetic compass elements that are attached to the standard magnetic compass card. The actual construction of the binnacle in its details are disclosed in my co-pending application filed Oct. 30, 1970, now U.S. Pat. No. 3,699,658. Briefly, the inductor element 12 consists of a laminated, ring-shaped core of highly permeable material such as Mumetal with a toroidal winding. The start and finish of the winding are adjacent to each other and are brought out to terminals 13 and 14 which are supplied with alternating current at a frequency of 400 Hz from an oscillator 16 and amplifier 18 that are connected to the coupling transformer 20 which has a winding 21 that feeds the two terminals 13 and 14 of the toroid. The toroidal winding is tapped 120° apart with taps 22 and 23 and these taps are connected to windings 24, 25 of the transformer 20. The magnets 11 of the compass 10 set up a field across the inductor element 12 and produce a flux therein. The alternating current that is supplied to the toroidal winding or inductor drives the core material to saturation in each half cycle. If the inductor is located in an ambient field such as the earth's field or the field from a nearby magnet system or a compass card, the path of least reluctance for the ambient field would be through the unsaturated core. When the core is saturated by the excitation winding referred to above, then the path of least reluctance is around the core. The external or ambient field is thus alternately included and excluded, or chopped, once each half cycle of the excitation frequency. The result of the induction of the ambient field will be a voltage at a frequency twice the excitation frequency. It was noted that the exciting voltage was at 400 cycles, for example, and therefore, at the windings 21, 24 and 25 there will be produced an output of a three wire type which will contain the information of the position of the magnets 11 since the distribution of the 800 Hz signal will depend upon the angular position of these magnets. The output of the three windings 21, 24 and 25 are connected to a differential synchro generally indicated 26 which consists of a stator 27 and a rotor 28. Each of these has three sets of coils connected in a star and the transformer windings are connected to the stator 27. Currents circulating in the stator 27 will create voltages in the differential rotor 28. Now if a knob 29 is connected to the rotor 28 through suitable gearing and the rotor is turned relative to the stator, it will be apparent that the fields of this differential synchro will be rotated by the amount and direction of the angular displacement of the rotor 28. With suitable gear reduction between the dial 29 and the rotor 28, it may permit spreading out a large number of angular degrees as, for example, 100°, that is 50° west variation and 50° east variation over a 300° dial. The star windings of the rotor 28 of the differential synchro 26 are connected to star windings of the stator of the synchro control transformer 30 and the rotor winding 32 thereof is connected through a suitable amplifier 34 to one winding 36 of a two phase servo motor generally indicated 40. It will be apparent to this point that the control transformer 30 receives the 800 Hz signals that contain the heading information, and if the rotor 32 of the control transformer 30 is turned, there will be an 800 Hz signal for all angles except when the angle made by the rotor 32 and the stator windings 31 of the control transformer coincide with the angle made by the ambient field within the toroidal winding of the inductor 12. The rotor output 32 will of course fall to zero in this null position and for every constant heading of a vessel there will be a rotor angle that produces a zero output. It is helpful if the amplifier 34 as well as amplifying the 800 Hz signal from the rotor 32 additionally filters the same with a band pass filter to enhance only 800 Hz information. The two phase servo motor 40 will be provided in its other winding 42 with an 800 Hz signal which will be supplied from a frequency doubler 43 and through amplifier 44.

Connected to the rotor shaft output of the control transformer 30 is a mechanical deviation corrector 38. The purpose of the mechanical deviation corrector is to correct residual deviation that is found in the vehicle after the magnetic compass is placed in position. Residual deviation effects are usually caused by large masses of iron which cannot be entirely removed by the use of the normal deviation corrector systems used in conjunction with the Flinders bar and quadrantal soft-iron spheres. The mechanical deviation corrector 38 is a well known system in and of itself and is illustrated in FIG. 4 in U. S. Pat. No. 2,308,566. Basically it consists of a cam follower system to inject differentially an angle of correction into a transmission system. The cam is shaped by distorting a strip of metal by equally spaced adjusting screws to conform to the deviation curve.

It will now be apparent that the servo loop is effectively closed since the motor 40 is connected via a shaft 46 and suitable gear reduction unit 47 to a mechanical connection or shaft 49 which comes from the mechanical deviation corrector 38. It will be apparent that a common oscillator 16 is being used to generate not only the signal being fed to the inductor 12 but also is being used through the frequency doubler and amplifier to feed the fixed or reference phase of the servo motor 40. Thus two phases at the motor will maintain a constant relationship even though the frequency of the oscillator 16 may drift slightly due to temperature, time or other factors that are commonly known to those skilled in the electronic arts. Now if we assume that the angle of the rotor of the synchro control transformer 30 and the compass heading agree, there will be zero output from the rotor 32 and so zero output at the control phase of the two phase motor. However, if the vessel's head changes, there is immediately an output at the control transformer 30 which is amplified and causes the synchro motor 40 to start and run in a direction depending upon the direction of the control phase changes caused by the new heading. Of course the synchro motor shaft is connected to the control transformer rotor shaft by a common mechanical shafting connection 49 and will continue to turn until the rotor output falls to zero at which time the control transformer rotor shaft angle will agree with the new compass heading. It will be apparent therefore that the servo motor and the control transformer make up the closed-loop servo system. It can be seen that indication of the position can be easily had by connecting a dial to the mechanical connection 49 of the control transformer and servo motor shaft and this dial will remotely indicate the compass heading. It will turn to the left or the right as indicated by the output of the inductor 12 which in turn follows the heading of the vessel. Such a dial is shown diagrammatically at 50 as being coupled to this mechanical connection.

Additional outputs are available from the shaft 49 and shown coupled to this shaft with the heading information is an encoder 52. The encoder 52 may take a variety of forms. Basically it is an electromechanical device which will change shaft angle to precise digital logic. In one of its forms, as shown for example in U.S. Pat. No. 3,099,003, it may consist of a cylindrical housing having a ball bearing mounted disc which will make one convolution for each revolution of the shaft 49 to which it is connected. The disc has a pattern of electrically conducting segments and a brush holder makes contact with different combinations of segments in binary code fashion. Since the display requires that the lowest number be all zeros and that the maximum number be 359, a 10 path encoder disc will be required to produce this result utilizing four paths for units, four paths for tens and two paths for hundreds. The output of the encoder 52 is fed to a bistable 54. The bistable latch may, for example, be a series 74N element manufactured by Texas Instruments, Incorporated, and more particularly a SN7475N unit. It is basically a commercial available monolithic quadruple bistable latch with complementary Q and $\overline{Q}$ outputs. A schematic functional block diagram of one such latch is shown in FIG. 3 of the drawings and information that is presented at the data input 90 is transferred to the Q output 91 when the clock 59 produces a positive pulse as shown in FIG. 3 and the Q output will follow the data input as long as the clock presents a positive pulse. When the clock goes low for a period of 250 MS as shown, the information that was present at the data input 90 at the time the transition occurred is retained at the Q output until the clock again produces a positive pulse and it will be readily seen the latch is ideally suited for the temporary storage of binary information.

The output of four such bistable latches, as shown in FIG. 3, is necessary for each digit of the indicator. Since the conventional packaging is a quadruple chip, three chips feed three decoder drivers which take the binary coded information from the output of the latch and produce 4 line BCD logic signals. Referring to FIGS. 1 and 2, it should therefore be understood that the blocks 54, 56 are actually several commercial chips. The choice of the particular decoder driver to be used is dictated by the type of display which is to be fed. For example, in the drawings the display 58 can take any number of forms of numeral indicator tubes. If Nixie tubes are used, there are 10 wires inside of each tube shaped to represent numerals zero through nine, all insulated from each other and encapsulated in an inner gas such as neon. The decoder driver 56 must therefore decode the four line BCD information and put it into one or the other of the wire segments of the Nixie tube applying about 100 volts to the segments in order to have the tube glow. Another commercial form of display tube is the Numitron which consists of a number of incandescent single helical coil segments in a evacuated glass so that by the application of a dc voltage to the appropriate coil segment, it will flow in a clear fine line and character or numeral representations can be provided by proper orientation of the coil segments. For the display numerals, as in the instant application, a seven segment Numitron display tube can be used and the decoder-driver for such Numitron tubes are basically integrated circuits known under the RCA identification No. CB2500E or Texas Instruments No. SC5446N or equivalents.

The gate or latch 54 is therefore used to provide controlled display time when the information coming from the servo system is moving faster than can be assimilated by the person viewing the numeric display at 58. To this end, a pulse clock or oscillator or pulse generator (clock) 59 is provided and it supplies short pulses of approximately 2.5 milliseconds, spaced approximately every 250 milliseconds, which allow the latch or gate 54 to open once every 250 milliseconds for a period of 2.5 milliseconds. The end result is that the information on the digital displays will be displayed for a period of 250 milliseconds which is a sufficient length of time so that the human eye and brain can process the visual information. The manner in which it is operated can be amply demonstrated if one considered that a vessel is yawing plus or minus 20° in 6 seconds. This represents a complete angular change of 80° in 6 seconds or at an average rate of change of 13.6° per second. Now if this was to be displayed, each whole degree of heading change would occur every 50 milliseconds, which is an impossible rate for anyone to assimilate any information at all since the brain and human eye cannot assimilate data that changes in so short a time. With such fast changing information even being displayed on a conventional compass card psychological testing has indicated that there is considerable fatigue of a helmsman on a ship which is experiencing great yawing conditions. However, tests in which the display rate has been reduced as by utilizing the pulse, clock and latch system of this invention, demonstrate that the fatigue factor has been considerably reduced and mid course may be better maintained.

The device of the instant invention may readily act as a true bearing mode device for operation of radars and in fact gyro repeaters on a ship. The manner in which this may be accomplished is best seen by referring to FIG. 1 where a synchro transmitter 60 may be connected to the shaft 49. The rotors of this transmitter may be fed with ship's power as indicated by the block 65 and the three-phase output thereof fed via a changeover switch 66 to the gyro distribution and amplifier. From this point the radar and other devices which require true bearing mode output may be fed as well as gyro repeaters on the ship if the same is so equipped.

Additionally the system may be fed by the gyro on gyro equipped vessels to permit the digital display to indicate directly from the gyro. Inasmuch as the servo motor 40 is arranged to operate from an 800 Hz reference, it is necessary to add electronic circuitry so that the heading information from the gyro may properly operate the servo motor. By referring to FIG. 2, there is shown partially in block diagram form and partially schematically the manner in which this is accomplished. As mentioned above, the additional synchro transmitter 60, which may operate as a receiver, has the rotor 61 thereof mechanically coupled to the shaft 49. Electrically the rotor 61 is connected to a phase sensitive detector of demodulator 68 using the ship's power as, for example, 60 Hz as a reference. The output of the demodulator 68 is a d.c. signal whose amplitude is a function of the heading of the vessel. The stator 62 will be connected to a three-wire repeater from the gyro distribution box and can be accomplished by switch 66. The demodulated variable d.c. signal is now passed through a low pass filter 72 and thence to a modulator 74 which is fed with both an 800 Hz signal source over line 75 and has the output thereof connected to terminals 76 at switch 77. The effect of a modulator is that the gyro error signal modulates the 800 Hz reference frequency or carrier so that the same can be fed to the servo motor 40 at winding 36 and this in turn will create on shaft 49 output that is in effect gyro output and thus the digital display will be gyro information.

It will be apparent, therefore, that by the addition effectively of a synchro control transformer or transmitter that will also operate in a receiver mode, the compass system of this invention may operate from a gyro and provide digital readout at the master indicator with the dial 50 as well as providing the digital numeric readout at display position 58. As seen in FIG. 2 with the throwing of three switches all systems may operate from the magnetic sensor or inductor 12 in the event of a gyro failure. In this latter mode the synchro control transformer 60 substitutes for the gyro transmitting synchro 80 and converts to drive the gyro heading reference amplifiers and gyro repeater lines that feed tracking records, radars and sonars and other shipboard equipment with true bearing heading reference.

It will also be apparent that the instant invention, while shown as utilizing an ac servo system will operate with a dc servo as shown in FIG. 1A where the dotted portion of FIG. 1 is replaced by the dc system with suitable power supplies. The phase sensitive detector may take the form shown by Gunn U. S. Pat. No. 2,054,318 by principally utilizing the phase sensitive bridge rectifier system.

I claim:

1. A navigation system comprising a magnetic field, an inductor having an output responsive to said magnetic field a synchro control transformer having a stator, a differential synchro coupled between the inductor and the stator of the synchro control transformer, a graduated dial, a digital display, a decoder driver feeding the digital display, an encoder, a servo amplifier electrically coupled to the rotor of the synchro control transformer, a servo motor having an output shaft electrically coupled to the servo amplifier, a data output shaft, said encoder and graduated dial coupled to the data shaft, a bistable latch, a pulse clock, said pulse clock coupled to said latch, said latch having its input coupled to said encoder and its output to said decoder driver repetitiously sampling information for a short period and retaining the information until the next sampling, said synchro control transformer rotor and said servo motor shaft mechanically coupled to the data output shaft to complete a closed loop servo system, whereby relative movement between the inductor and the magnetic field will cause rotation of said servo motor shaft in proportion to the relative movement of the magnetic field and the inductor and said digital display and graduated dial will simultaneously indicate the angular position of the magnetic field relative to the inductor plus or minus any correction introduced by the synchro differential to reproduce true bearing in accordance with set-in magnetic variation.

2. A navigation system as in claim 1 wherein the inductor is a polyphase element, an a.c. current course, said a.c. current source coupled to said polyphase inductor, said synchro control transformer having a polyphase stator connected to said polyphase inductor.

3. A navigation system as in claim 1 wherein a synchro transmitter is connected to said data shaft and energized with a.c. gyro reference voltage, said transmitter being coupled to a gyro distribution system whereby gyro repeaters may indicate the information of said navigation system.

4. A navigation system as in claim 1 including a gyro system having a gyro distribution amplifier wherein a synchro polyphase transmitter has its rotor mechanically coupled to the data shaft and electrically coupled to gyro reference voltage, a transfer switch, the polyphase stator of said transmitter is connected to said gyro distribution amplifier through the transfer switch whereby heading information is fed to said gyro system.

5. A navigation system as in claim 1 including a gyro repeater and a transfer switch, said repeater being coupled through the transfer switch to the synchro polyphase stator, the rotor of which is mechanically coupled to the data shaft, means combining the electrical output of the rotor and a gyro reference voltage and means to supply the output signal of said combining means to the servo motor.

6. A navigation system as in claim 1 wherein the magnetic field is produced from a compass bowl having a compass card with magnets attached to said card and said inductor is mounted on said compass bowl.

* * * * *